(12) United States Patent
Shatalin et al.

(10) Patent No.: US 11,022,467 B2
(45) Date of Patent: Jun. 1, 2021

(54) METHOD AND APPARATUS FOR OPTICAL SENSING

(71) Applicants: Silixa Ltd., Elstree (GB); Chevron U.S.A. Inc., San Ramon, CA (US)

(72) Inventors: Sergey Shatalin, Elstree (GB); Julian Dajczgewand, Elstree (GB); Mahmoud Farhadiroushan, Elstree (GB); Tom Parker, Elstree (GB)

(73) Assignees: Silixa Ltd., Elstree (GB); Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 16/474,747

(22) PCT Filed: Jan. 5, 2018

(86) PCT No.: PCT/GB2018/050027
§ 371 (c)(1),
(2) Date: Jun. 28, 2019

(87) PCT Pub. No.: WO2018/127708
PCT Pub. Date: Jul. 12, 2018

(65) Prior Publication Data
US 2019/0323863 A1    Oct. 24, 2019

(30) Foreign Application Priority Data
Jan. 6, 2017   (GB) ..................... 1700266

(51) Int. Cl.
*G02B 6/36*     (2006.01)
*G01D 5/353*    (2006.01)
*G01H 9/00*     (2006.01)

(52) U.S. Cl.
CPC ....... *G01D 5/3537* (2013.01); *G01D 5/35306* (2013.01); *G01D 5/35354* (2013.01); *G01D 5/35383* (2013.01); *G01H 9/004* (2013.01)

(58) Field of Classification Search
CPC ............. G01D 5/3537; G01D 5/35306; G01D 5/35354; G01D 5/35383; G01H 9/004
See application file for complete search history.

(56) References Cited

U.S. PATENT DOCUMENTS

| 5,557,400 A | 9/1996 | Sorin et al. |
| 6,084,233 A | 7/2000 | Hodgson et al. |

(Continued)

FOREIGN PATENT DOCUMENTS

| AU | 2015200314 A1 | 2/2015 |
| CN | 101718942 A | 6/2010 |

(Continued)

OTHER PUBLICATIONS

European Patent Office (ISA), International Search Report and Written Opinion for International Application No. PCT/GB2018/050027, dated Feb. 13, 2018.

(Continued)

*Primary Examiner* — Ellen E Kim
(74) *Attorney, Agent, or Firm* — Honigman LLP; Matthew H. Szalach; Jonathan P. O'Brien (57) ABSTRACT

An improved optical fiber distributed acoustic sensor system uses an optical fiber having reflector portions distributed along its length in at least a first portion. The reflector portions are positioned along the fiber separated by a distance that is equivalent to twice the distance an optical pulse travels along the fiber in a single sampling period of the data acquisition opto-electronics within the sensor system. No oversampling of the reflections of the optical pulses from the reflector portions is undertaken. The sampling points for data acquisition in the sensor system are aligned with the reflections that arrive at the sensor system from along the sensing fiber. Adaptive delay componentry adaptively aligns the reflected optical signals (or their electrical analogues) with the sampling points. Control over the sampling points (Continued)

can re-synchronise the sampling points with the returning reflections. Reflection equalisation componentry may reduce the dynamic range of the returning reflections.

17 Claims, 7 Drawing Sheets

(56) References Cited

U.S. PATENT DOCUMENTS

| | | | |
|---|---|---|---|
| 6,233,373 B1 | 5/2001 | Askins et al. | |
| 9,140,582 B2* | 9/2015 | Farhadiroushan | E21B 47/002 |
| 2002/0025097 A1 | 2/2002 | Cooper et al. | |
| 2005/0232531 A1 | 10/2005 | Hadley et al. | |
| 2006/0018586 A1* | 1/2006 | Kishida | G01B 11/16 |
| | | | 385/12 |
| 2008/0291461 A1 | 11/2008 | Waagaard et al. | |
| 2010/0067018 A1 | 3/2010 | Crickmore et al. | |
| 2017/0075029 A1* | 3/2017 | Cuny | G01V 1/46 |
| 2019/0025094 A1* | 1/2019 | Lewis | G01D 5/35361 |

FOREIGN PATENT DOCUMENTS

| | | |
|---|---|---|
| GB | 2419184 A | 4/2006 |
| GB | 2478915 A | 9/2011 |
| WO | WO-2003106929 A1 | 12/2003 |
| WO | WO-2016029110 A1 | 2/2016 |
| WO | WO-2016142695 A1 | 9/2016 |

OTHER PUBLICATIONS

Intellectual Property Office (GB), Search Report for GB Application No. 1700266.8, dated May 19, 2017.
Intellectual Property Office (GB), Search Report for GB Application No. 1700266.8, dated Apr. 12, 2017.

* cited by examiner

METHOD AND APPARATUS FOR OPTICAL SENSING

CROSS-REFERENCE TO RELATED APPLICATIONS

This application claims priority under 35 U.S.C. § 371 to Patent Cooperation Treaty Application No. PCT/GB2018/050027, filed Jan. 5, 2018, which claims the benefit of earlier-filed British Application No. GB 1700266.8, filed Jan. 6, 2017, the entire contents of which are incorporated herein by reference.

TECHNICAL FIELD

Embodiments of the present invention relate to distributed optical fibre sensors, and in particular in some embodiments to such sensors with reflective elements integrated into the sensing optical fiber.

BACKGROUND TO THE INVENTION AND PRIOR ART

Optical fiber based distributed sensor systems are finding many applications, in particular in the oil and gas industry for flow monitoring and seismic detection, and in the security industry for area or perimeter security monitoring, or monitoring along a long line such as a pipeline or railway line. The present applicant, Silixa Ltd, of Elstree, London, markets two optical fiber distributed sensing systems, the Silixa® iDAS™ system, which is a very sensitive optical fiber distributed acoustic sensor, and the Silixa® Ultima™ system, which is a distributed optical fiber based temperature sensor. Further details of the iDAS™ system are available at the priority date at http://www.silixa.com/technology/idas/, and further details of the Ultima™ system are available at the priority date at http://www.silixa.com/technology/dts/. In addition, the present applicant's earlier International patent application WO 2010/136810 gives further technical details of the operation of its distributed acoustic sensor system, the entire contents of which that are necessary for understanding the present invention being incorporated herein by reference.

The Silixa® iDAS™ system is presently class leading in terms of spatial resolution, frequency response and sensitivity, and is capable of resolving individual acoustic signals with a spatial resolution of down to 1 m along the length of the fiber, at frequencies up to 100 kHz. However, it is always desirable to try and improve the performance in terms of the any of the resolution, frequency response, or sensitivity parameters noted.

One development that has been found to improve performance of the Silixa® DAS system is to insert into the fiber weak (by which we mean of low reflectivity) broadband reflectors periodically along the fiber. The reflectors reflect only a small proportion of the light from the DAS incident thereon back along the fiber, typically in the region of 0.001% to 0.1%, but preferably around 0.01% reflectivity per reflector. In addition, to allow for temperature and strain compensation, the reflection bandwidth is relatively broadband, i.e. equal or greater than the region of +/−2 nm, preferably as large as +/−5 nm from the nominal laser wavelength. This provides for temperature and strain dependent reflectivity of the reflectors to be accommodated, particularly where the reflectors are formed from gratings, that are known to often exhibit temperature and strain dependence of the reflected wavelength over a broad e.g. +/−2 nm bandwidth. In some arrangements the reflectors are formed from a series of fiber Bragg gratings, each with a different center reflecting frequency, the reflecting frequencies and bandwidths of the gratings being selected to provide the broadband reflection. In other embodiments a chirped grating may also be used to provide the same effect. In other arrangements a short grating with low reflectivity and broad bandwidth may be written into the sensing fibre using femtosecond laser writing process. In some arrangements, the reflectors are spaced at the gauge length i.e. the desired spatial resolution of the optical fiber DAS, in other embodiments the reflectors are spaced at a distance calculated in dependence on the gauge length, for example as a fraction or multiple thereof.

WO2016/142695 to the present applicants describes such arrangements in more details, and in particular describes an optical fiber distributed sensor that improves on the system described in WO 2010/136810, by improving the signal to noise ratio. This is accomplished by using a sensing fibre having a number of weak, relatively broadband reflection marker points along the length thereof, spaced generally at the same distance as the gauge length, being the path length delay applied to the reflected pulse in one arm of the interferometer of the DAS system, and which in turn relates to the spatial resolution obtained. Due to the weak reflectivity (around 0.01% reflectivity is envisaged, as discussed above), the reflection loss along the fibre is small, and hence thousands of reflection point may be introduced. For example, for a sensing resolution of 10 m, 1000 reflection points gives an excess loss of just 0.4 dB, and a sensing length is obtained of 10 km. The processing performed in the DAS system is substantially identical to that performed on backscatter signals from along a standard fibre, but because there is a deliberate reflection back along the fibre rather than a scattering, a greater amount of reflected signal is received back at the DAS box, that is also more stable, both factors of which contribute to the increase in signal to noise performance. A specific aspect that helps to increase SNR further is that because the reflection points are fixed along the fibre, then 1/f noise that is due to the fundamental nature of random backscattering is reduced to an unmeasurable level. This helps reduce the noise floor of the signal of the processed signal. Hence, by increasing the optical signal level in combination with the reduction in 1/f noise, total signal to noise ratio is increased. Tests of the technique show that an improvement in signal to noise ratio in excess of a factor of 10, and in some cases in excess of 100 is achieved.

Regarding the nature of reflection points, in some arrangements a series of Fiber Bragg Gratings (FBGs) are used for each reflection point, with a different peak reflection wavelength but with overlapping reflection bandwidths, the gratings being written into the fiber next to each other, separated by a small amount, of the order of 5 to 15 mm, and preferably around 10 mm. Where 5 gratings are used with a 10 mm separation between them, the total length of each reflection point is around 45 mm, and the total reflection bandwidth allowing for the overlapping reflection bandwidths of the individual gratings is around +/−2 nm, although in some arrangements it can be as wide as at least +/−5 nm. In other arrangements ideally a single, relatively weak broadband reflector would be used; for example a chirped grating or a short, broadband, weakly reflecting mirror less than 1 mm and typically 100□ m in length. Further embodiments are described below.

The use of reflection points along the fiber also opens up other possibilities, particularly concerning the spatial resolution of the DAS. For example, in some arrangements a simultaneous dual-resolution arrangement can be provided, by selection of appropriate gauge length and pulse width with respect to the spacing of the reflector portions along the fiber. For example, for a given reflector spacing L, provided the pulse width is less than L, for example around 0.75 L, and further provided that the gauge length, i.e. the difference in length between different arms of the interferometer in the DAS, which in turn relates to the spatial resolution, is chosen such that the reflected light and the delayed version thereof in the interferometer have been consecutively reflected from neighbouring reflection points and then non-neighbouring reflection points, then multi-resolution performance will be successively obtained. For example, where L is 10 m, pulse width is 7.5 m, and gauge length (effective virtual pulse separation in the interferometer corresponding to interferometer path length difference) is 15 m, then alternating 10 m and 20 m resolution performance is obtained as the pulses travel along the fiber.

In other arrangements the control of pulse timing characteristics with respect to reflector separation allows for resolution selectivity. In these arrangements, the reflector separations can be smaller than the initial gauge length, such that a first spatial resolution is obtained, but by then reducing the gauge length to match the smaller pitch of the reflectors then a second, improved, resolution is obtained. Providing a denser spatial distribution of reflectors therefore allows selective spatial resolution from the same fiber. In preferred arrangements, the reflectors are spaced at half the gauge length i.e. at half the desired spatial resolution of the optical fiber DAS. Further details are available in WO2016/142695 itself, the entire contents thereof being incorporated herein by reference.

Whilst the arrangement of WO2016/142695 introduces the concept of weak reflectors in the sensing fiber, and permits use of such fibers with a standard Silixa DAS system based on the earlier disclosure in WO2010/136810, at finer spatial resolutions measured in centimetres, a performance limitation starts to be met relating to the speed of the signal acquisition electronics in the DAS. For example, high end analogue-to-digital converters can run as fast as 2 GigaSamples/second (GS/s), which is equivalent to approximately 5.05 cm distance along an optical fibre, considering the speed of light in a fibre. Allowing for the Nyquist sampling criterion an upper spatial resolution limit of 10.1 cm is then achievable at such a sampling speed of 2 GS/s. As finer spatial resolutions towards this limit become to be used, the achievable degree of oversampling by the DAS electronics of the optical signals becomes less and less, such that the actual temporal point of sampling of the optical signals becomes more and more important.

SUMMARY OF THE INVENTION

Embodiments of the invention provide an improved optical fiber distributed acoustic sensor system that makes use of an optical fiber having reflector portions distributed along its length in at least a first portion. In particular, in order to improve the spatial resolution of the sensor system to the finest achievable, the reflector portions are positioned along the fiber separated by a distance that is equivalent to twice the distance an optical pulse travels along the fiber in the finest achievable single sampling period of the data acquisition opto-electronics within the sensor system. As such, no oversampling of the reflections of the optical pulses from the reflector portions is undertaken, which means that it is important that the sampling points for data acquisition in the sensor system are coincident with the reflections that arrive at the sensor system from reflector points positioned along the sensing fiber. In order to ensure such alignment, adaptive delay componentry may be used to adaptively align the reflected optical signals (or their electrical analogues) with the sampling points. Alternatively, control over the sampling points can also be undertaken to re-synchronise the sampling points with the returning reflections. In addition, in order to allow higher speed sampling to be undertaken, reflection equalisation componentry may also be used to reduce the dynamic range of the returning reflections.

In view of the above, from one aspect there is provided a distributed sensing system, comprising an optical fiber deployable in an environment to be sensed, the optical fiber having reflector portions regularly distributed in at least a first region thereof and having a first spacing therebetween. The system further includes an optical signal source arranged in use to input optical pulses into the optical fiber, and sensing apparatus arranged in use to detect light from the optical pulses reflected back along the optical fiber from the reflector portions and to determine any one or more of an acoustic, vibration, strain, temperature or other parameter that perturbs the path length of the optical fiber in dependence on the reflected light. The sensing apparatus comprises opto-electronic componentry that samples the reflected light or light derived therefrom at temporally discrete sampling points at a first sampling rate, and the spacing between the reflector portions is a predetermined function of the first sampling rate, or vice versa. In addition, pulse reflection alignment componentry is further included arranged to temporally align reflected light from the optical pulses reflected back along the fiber from the reflector portions with the sampling points.

With the above arrangement an improved spatial resolution optical fiber distributed sensor system is obtained, where the spatial resolution is as high as it can be allowing for the sampling rate achievable from the opto-electronic componentry. In this respect, in some embodiments of the invention in order to achieve the finest spatial resolution possible the relationship between the spacing between the reflector portions in the fiber and the sampling rate is such that no meaningful oversampling occurs. Typically, such a condition is met when the sampling rate is at or near to the Nyquist limit for the spacing between the reflector portions in the fiber, i.e. the sampling rate is at least twice the spacing of the reflector portions, given the speed of light in the fiber, or alternatively the spacing of the reflector portions is at least half distance light would travel in the fiber in the time available at the highest available sampling rate of the digital signal acquisition (DAQ) electronics in the DAS. More specifically, in embodiments of the invention we envisage the spacing of the reflector portions along the fiber to be at least twice but no more than four times the distance x light would travel in the fiber at the highest sampling rate of the DAQ electronics, and more preferably at least twice but no more than three times the distance x. For the highest spatial resolution possible, the spacing of the reflector portions is equal to twice the distance x i.e. is set at the Nyquist limit, for the highest sampling rate of the DAQ electronics.

In one embodiment the pulse reflection alignment componentry comprises one or more variable delay components arranged to apply a delay to pulse reflections from the reflector portions as received at the sensing apparatus to temporally align the pulse reflections with the sampling points. The one or more variable delay components may be one or more optical delays arranged to delay the pulse reflections before they are sampled by the opto-electronic componentry, or alternatively may be one or more electrical delays arranged to delay the electrical signals between conversion from reflected light pulses to electrical signals and the sampling of the converted signals. In other embodiments, combinations of electrical and optical delays may be used.

In another embodiment the pulse reflection alignment componentry further comprises sample point reset circuitry to reset the timing of the sampling points should they misalign with the reflected light from the optical pulses received at the sensing apparatus from the reflector portions along the fiber. This allows for alignment between sampling points and reflections from the reflector portions to be more easily maintained all along the sensing fibre.

In one embodiment there is further provided signal level adjustment circuitry arranged to equalise the amplitude of the reflected light from the reflector portions received at the sensing apparatus. In particular, the signal level adjustment circuitry may equalise the amplitude of the reflected light in order to reduce the required dynamic range of the opto-electronic componentry that samples the reflected light. In some embodiments the signal level adjustment circuitry may comprise one or more of a signal amplifier or attenuator, the signal amplifier or attenuator being one or more of either i) an electrical amplifier or attenuator; and/or ii) an optical amplifier or attenuator.

From another aspect, there is further provided a distributed sensing system, comprising an optical fiber deployable in an environment to be sensed, the optical fiber having reflector portions regularly distributed in at least a first region thereof and having a first spacing therebetween. An optical signal source is further included arranged in use to input optical pulses into the optical fiber, and a sensing apparatus is provided arranged in use to detect light from the optical pulses reflected back along the optical fiber from the reflector portions and to determine any one or more of an acoustic, vibration, temperature or other parameter that perturbs the path length of the optical fiber in dependence on the reflected light, the sensing apparatus comprising opto-electronic componentry that samples the reflected light or light derived therefrom at temporally discrete sampling points at a first sampling rate. In order to provide as high a spatial resolution as possible the spacing between the reflector portions is a function of the sampling rate, or vice versa, and the sensing apparatus further comprises signal level adjustment circuitry arranged to equalise the amplitude of the reflected light from the reflector portions received at the sensing apparatus.

From a further aspect there is also provided a method of monitoring flow along a pipe, comprising: providing a distributed sensing apparatus according to any of the preceding aspects, the optical fiber of the sensing apparatus being deployed substantially linearly along the length of the pipe; operating the distributed sensing apparatus to obtain acousto-vibrational data pertaining to flow conditions within the pipe; processing the acousto-vibrational data to identify eddies within the flow within the pipe; and tracking the identified eddies within the flow along the pipe in dependence on the acousto-vibrational data.

With such an arrangement accurate and high resolution eddie tracking for the the purposes of flow monitoring and metering can be undertaken. In this respect, therefore, in one embodiment the flow speed of fluid flow along the pipe is determined in dependence on the tracking of the identified eddies in the fluid flow as the eddies move along the pipe.

DESCRIPTION OF THE FIGURES

Further features and advantages of the present invention will become apparent from the following description of an embodiment thereof, presented by way of example only, and with reference to the accompanying drawings, wherein like reference numerals refer to like parts, and wherein.

OVERVIEW OF EMBODIMENTS

The DAS sensing system described in WO2016/142695 allows distributed acoustic and strain measurements with high signal to noise ratio, enabled partly through the use of markers deployed in the sensing fibre. Embodiments of the current invention build on this concept to push the spatial resolution performance of the system to a level measured in cm, which resolution then enables flow measurements in small pipes using a linear sensing fibre in a simple cable deployed linearly along a length of pipe, for example. In particular, when used in such an application, embodiments of the present invention allow deployment of fibre in a continuous manner along the pipe, so enabling distributed flow measurement. For example, in one use it is anticipated that optical fibre with regularly distributed reflective marker portions spaced apart in dependence on the desired sensing resolution will be deployed along the entire length of the producing zone of an oil well. Alternatively, sections of the fibre with reflective markers may be deployed at strategic locations along the well.

In embodiments of the present invention, a distributed strain measurement with gauge length (resolution) as low as approximately 10.1 cm can be obtained in some embodiments, though this gauge length can be tuned as needed and can be made finer with the use of higher sampling speed electronics. In this respect, the sampling speed available from the opto-electronics becomes the spatial resolution limiting factor.

For example, assume that the digitising electronics used in the DAS system described herein has an acquisition rate of 2 GS/s (which is equivalent to approximately 5.05 cm distance along the optical fibre, considering the speed of light in the fibre). To achieve 10.1 cm gauge length measurement with high SNR, we use markers in the fibre to increase scattering. These markers are separated at the gauge length distance (e.g. 10.1 cm separation). High bandwidth photoreceivers and digitising electronics must then be used (here, around 1 GHz, which is the highest which can be achieved for the 2 GS/s cards currently available). The fibre is interrogated with an optical pulse of around 500 ps duration (equivalent to around 5 cm).

Important to the correct function of such embodiments, where the sampling resolution (5.05 cm) is half the marker separation (10.1 cm), is that the DAQ sample points fall precisely on the marker positions. If the markers and DAQ positions are not aligned, then, due to the bandwidth of the detection electronics used and the spatial overlap between the propagating pulse and marker, each DAQ measurement records an incorrect combination of the marker and non-marker position.

A further timing requirement is that the first marker is aligned to a DAQ sampling point; the rest will then automatically follow. This first point alignment may be achieved by using a variable delay line in the optical (or electrical) path. The delay can be readily optimised to achieve the highest contrast between the signal at sampling points on the markers and those between the markers. In terms of how accurate the delay must be i.e. how precise the alignment between a DAQ sampling point and the markers must be, a delay resolution of around a quarter of the DAQ sampling resolution is sufficient, meaning that if DAQ sampling is 500 ps (5.05 cm), the delay resolution should be around 125 ps (1.3 cm). This relatively relaxed delay resolution condition means that only a few discrete delay choices are required (typically four or five) to cover all required eventualities, allowing for simple and fast delay switching architectures and components to be used.

For long lengths of measurement zone, or for multiple zones separated by a long distance, it is possible that, even using the alignment procedure described above, the alignment of the markers to the DAQ sampling points drifts as a function of distance. This can be rectified by varying the delay used, such that the signal is realigned. In the case of using sufficiently high speed componentry, it is possible to alter the delay as a function of distance, so ensuring alignment all along the length for each pulse of the laser. This can be achieved, for example, by using a network of fast switches and delay lines noting that only five discrete delay values are needed to achieve the range of delays needed. As an alternative embodiment the delay may be switched or swept more slowly such that multiple measurements are taken, each with a different delay. This will ensure that good alignment is achieved, though not necessarily at the same time, all along the fibre length. In this case, the data can then be processed separately according to which sections of the fibre have good alignment and then recombined to achieve a complete, accurate measurement of the acoustic field all along the sensing length, from which the distributed flow is derived.

In another embodiment a further technique would be to realign the DAQ clock as a function of distance along the fibre such that the alignment of the markers and DAQ samples is always maintained. In the case of the markers being deployed in separate zones, this clock realignment could be achieved as a discrete step in between the groups of markers.

Having given a brief overview of embodiments of the invention, a detailed description of an embodiment will now be undertaken below.

DETAILED DESCRIPTION OF THE EMBODIMENTS

Figure 1:
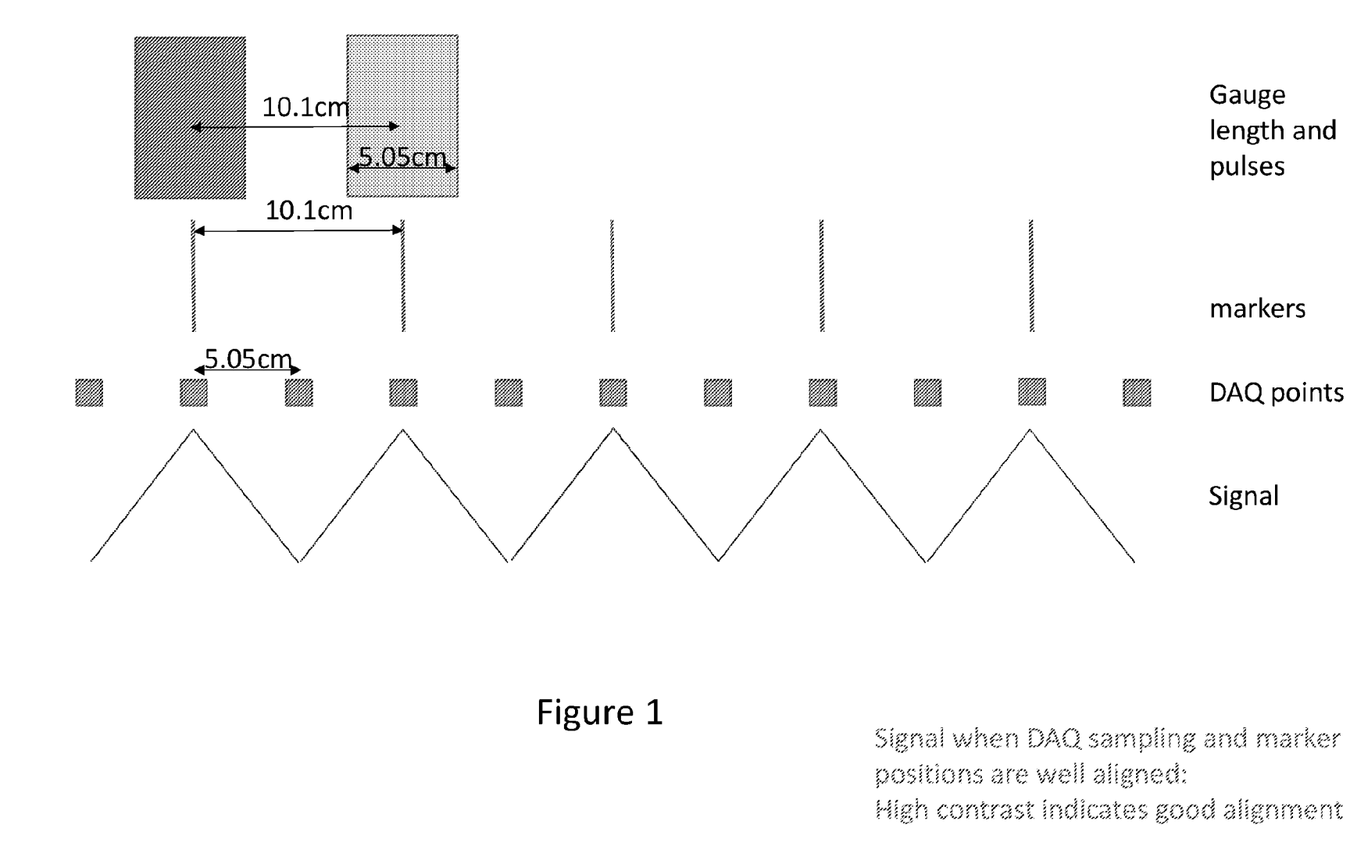
FIG. 1 is a diagram illustrating the ideal situation where digital acquisition (DAQ) sampling points are well aligned with reflections from the reflective markers along the fibre.
Figure 2:
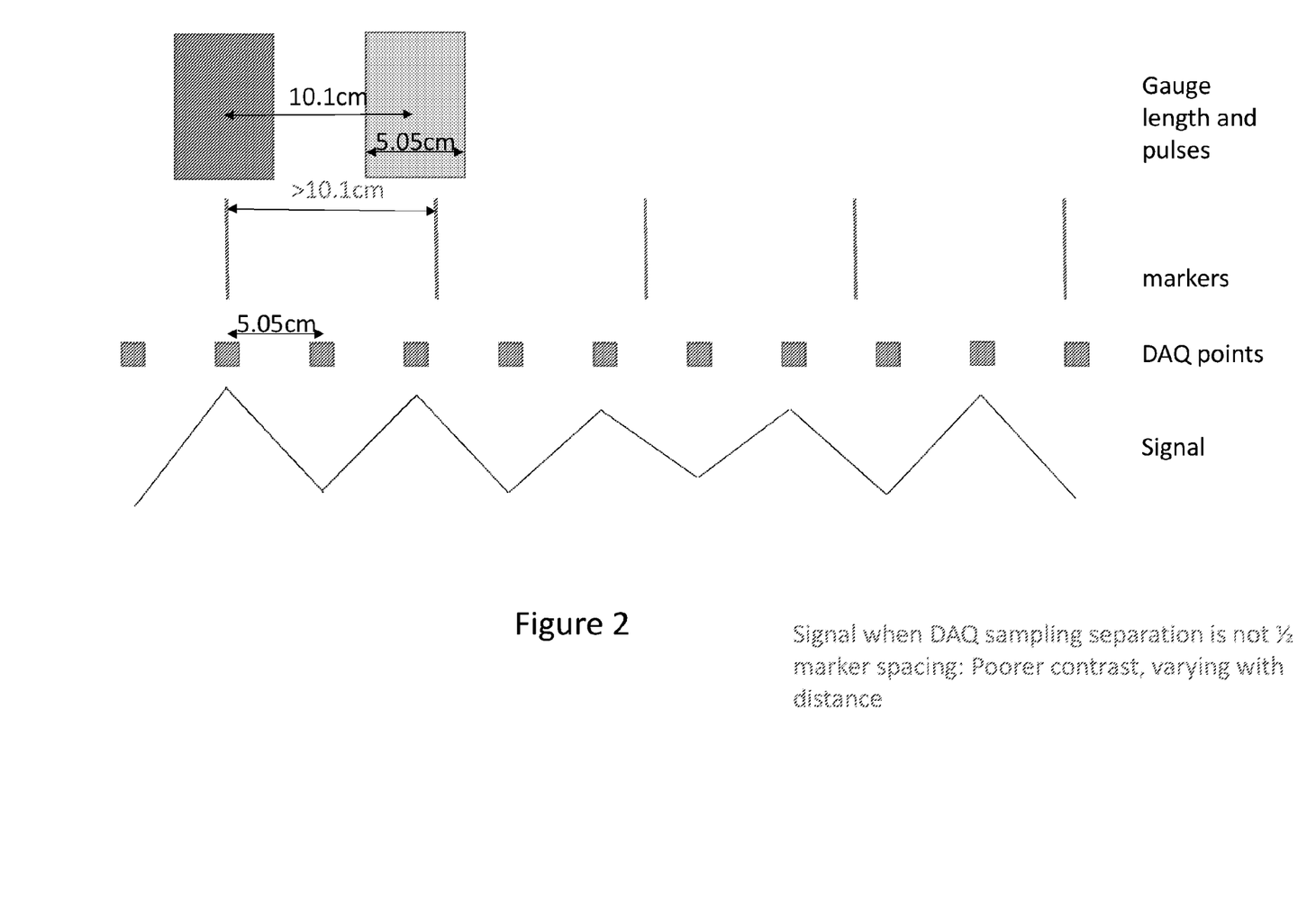
FIGS. 2 and 3 are diagrams illustrating situations where the DAQ sampling points are misaligned with reflections from the reflective markers.
Figure 3:
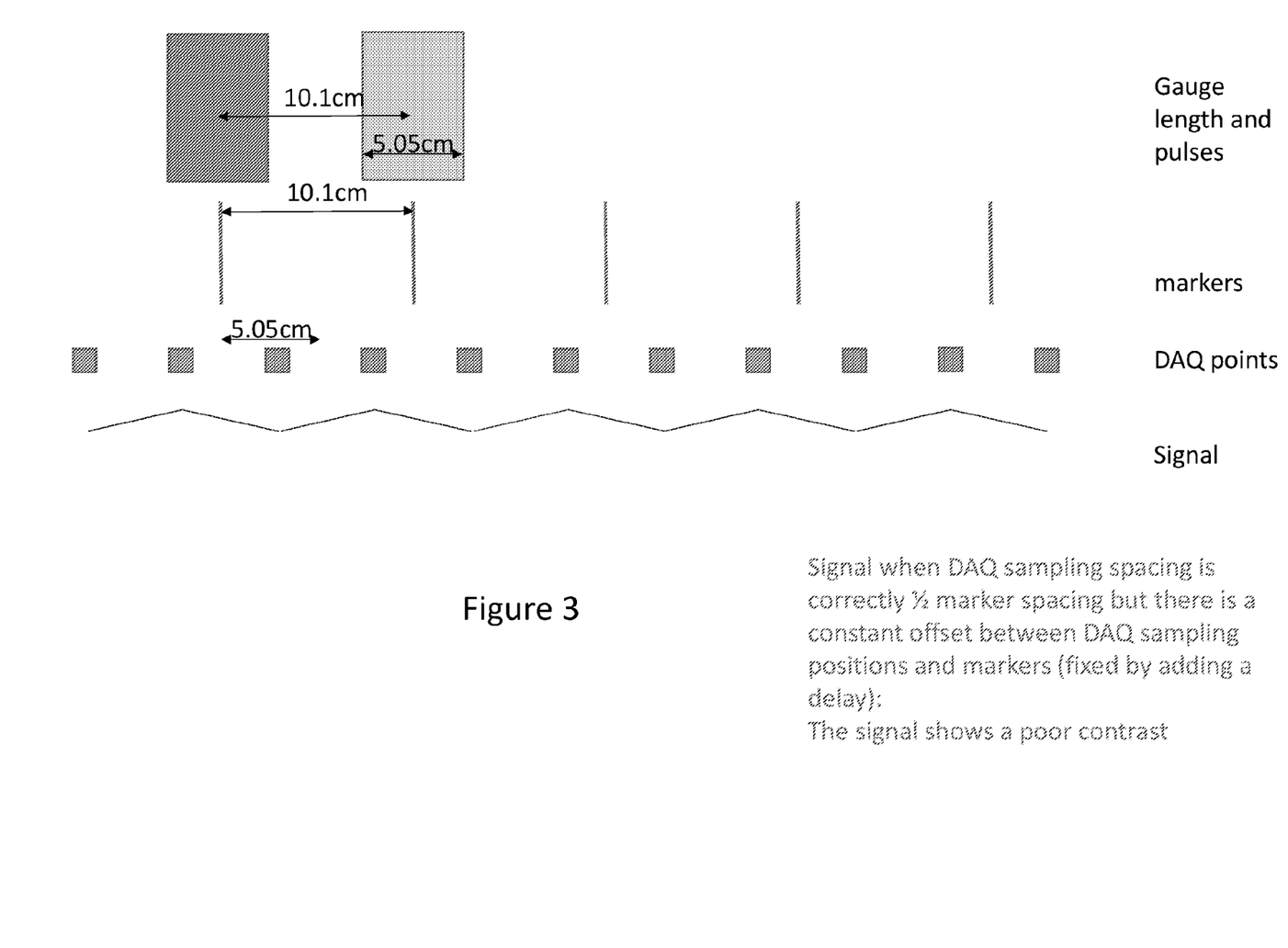

As noted previously, as finer spatial resolutions are used in an optical fibre DAS that uses reflective markers along the length of the sensing zone of the sensing fiber, as described in WO2016/142695, the degree of achievable oversampling by the signal acquisition electronics in the DAS becomes less and less, meaning that the actual precise sampling position with respect to the signals coming back from the reflector markers in the fibre becomes more important. FIGS. 1 to 3 illustrate this issue.

In FIG. 1 an optical fibre having reflectors (referred to in the figure as "markers") at the Nyquist limit of 10.1 cm for a 2 GS/s sampling rate is shown. Optical pulses of 500 ps in temporal length, which equates to about 5.05 cm in spatial length along the fibre, and separated centre-to-centre by 10.1 cm spatially (~1 ns temporally) are input into the sensing fibre, and the digital signal acquisition (DAQ) electronics system in the DAS is synchronised such that it samples in synchronicity with reflections arriving back from the markers. In such a case, as shown in FIG. 1, a high contrast signal is recorded between successive samples, indicative of good alignment between the DAQ sampling points and the reflections from the reflective markers along the fibre.

FIG. 2 illustrates the situation when the DAQ sampling points are not half the reflective marker spacing, in this case being less than half. In such a case the DAQ sampling points move in and out of alignment with the reflective markers along the fibre, with the result that the reflective signal contrast varies with distance along the fibre as the reflective markers move closer into alignment with the DAQ sampling points and then further away from alignment in turn along the fibre. The same result would be obtained if the DAQ sampling points were spaced from each other temporally at slightly more than half the reflective marker spacing.

FIG. 3 illustrates a third situation, where the DAQ sampling spacing is correctly set to half the reflective marker spacing, as in the example of FIG. 1, but the alignment between the DAQ sampling points and the reflective markers is not ideal, there being a constant offset between the DAQ sampling positions and the reflective markers. In this case, a signal of constant low contrast is obtained. Such an arrangement can be remedied and converted into the high contrast arrangement of FIG. 1 by the addition of a suitable delay between the DAQ sampling and the returning reflected signals along the fibre. For example, a short additional piece of fibre attached in series to the beginning of the sensing fibre would correct such a sampling phase issue.

Figure 4:
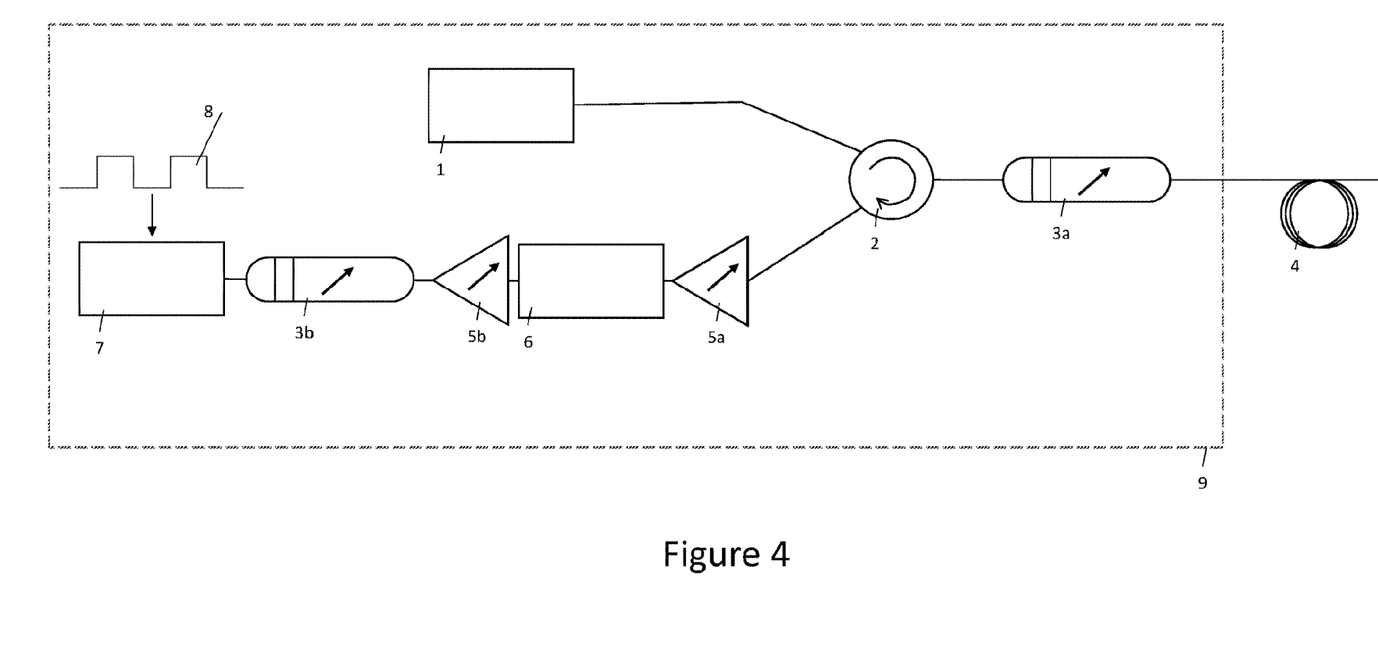
FIG. 4 is a block diagram of an embodiment of the invention.

In order to address the issues in FIGS. 2 and 3, to obtain the idealised situation of FIG. 1, in embodiments of the invention a DAS instrument as described in WO2010/136810 or WO2016/142695 is modified with additional componentry, to permit variable signal delays and attenuations (or amplifications) to be introduced into returning reflected signals, to achieve temporal alignment with DAQ sampling points, and also to achieve amplitude normalisation into a predetermined dynamic range. This latter normalisation allows lower resolution ADCs to be employed (e.g. 8-bit, rather than 12-bit), which are able to operate at higher sampling speeds and hence improve the spatial resolution of the DAS even further. FIG. 4 illustrates an outline embodiment of a distributed acoustic sensor (DAS) system which achieves the above.

In FIG. 4 a DAS instrument 9 is provided, having launch opto-electronics 1 such as a laser, pulse modulator and optical amplifier, arranged to launch sensing optical pulses into a length of sensing fibre 4. The sensing fibre 4 is a length of optical fibre having low-reflectivity markers formed therein, in this case at a high spatial resolution of, for example, 10.1 cm separation. The low-reflectivity markers and the sensing fibre may be configured as described in WO2016/142695, but with the finer spatial resolution given by the small (measured in cm) distance between the markers. Also provided are conventional DAS receiver opto-electronics 6, including an optical amplifier, interferometer, and high bandwidth photoreceivers. The launch optoelectronics 1 and the receiver opto-electronics 6 correspond to a conventional DAS, such as that shown in and described with respect to FIGS. 1 and 7 of WO2010/136810, incorporated herein by reference.

The optical pulses from the DAS launch opto-electronics 1 are received at a first port of a circulator 2 (or alternatively an optical coupler), and then are fed from a second port of the circulator to the sensing fibre 4, via an adjustable optical delay 3a, which is able to delay the pulses by up to one sampling period, to allow the pulses to be synchronised with the DAQ sampling points. A third port of the circulator 2 feeds reflections from the markers in the fibre 4 received at the second port into the DAS receiver opto-electronics 6, in this case via a variable optical amplifier or attenuator 5a. The output of the receiver opto-electronics, i.e. from the photo-detectors in the interferometer, are fed via a variable electrical amplifier or attenuator 5b to a variable electrical delay component 3b, before being fed to the DAQ card 7, for sampling. The DAQ card 7 receives a clock signal 8 which acts as or is used to derive a sampling clock to control the sampling of the output of the receiver opto-electronics 6.

It should be noted that FIG. 4 includes both an optical delay 3a and electrical delay 3b, as well as an optical amplifier or attenuator 5a and an electrical amplifier or attenuator 5b. In other embodiments of the invention it would be understood that it is not necessary to provide both optical and electrical amplification/attenuation (i.e. signal level normalisation) and delay, and that provided that signal level normalisation and timing delays are provided either optically or electrically respectively, then it would not be necessary to provide such functionality in both the optical and electrical domains of the system.

In a further variant of the present embodiment, the optical delay component 3a could also be introduced between the opto-electronics 1 and the circulator 2. To do so minimises losses as the reflected light does not pass through the component. However, such an arrangement only allows for one delay per laser pulse though, so is not suitable for controlling alignment all along the fibre length. In contrast, the position of the optical delay 3a as shown in FIG. 4 is preferable if using a fast component, which can control the reflected signal delay as a function of time as the laser pulse propagates, and so allow for control of the reflected light alignment all along the fibre. However, as the light passes through the component twice (in the outbound pulse and then as reflections), the losses are increased compared to the case where the delay is between the opto-electronics 1 and the circulator 2. Either option may be preferable, depending on the precise component used and its losses in a real-world implementation.

Figure 5:
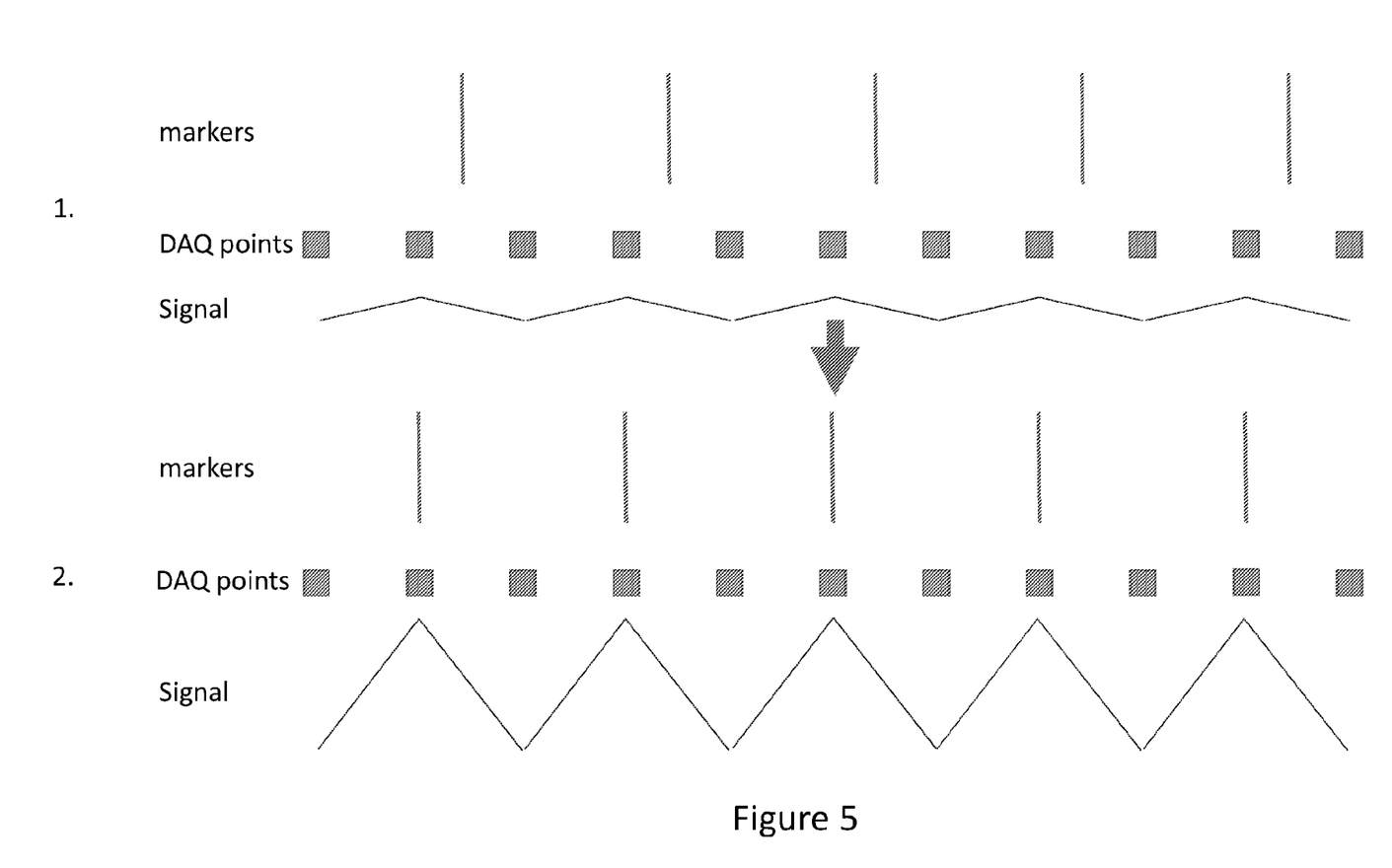
FIG. 5 is a diagram illustrating how misaligned DAQ points with reflections as received at the DAS from reflective markers can be corrected by the introduction of an appropriate delay.
Figure 6:
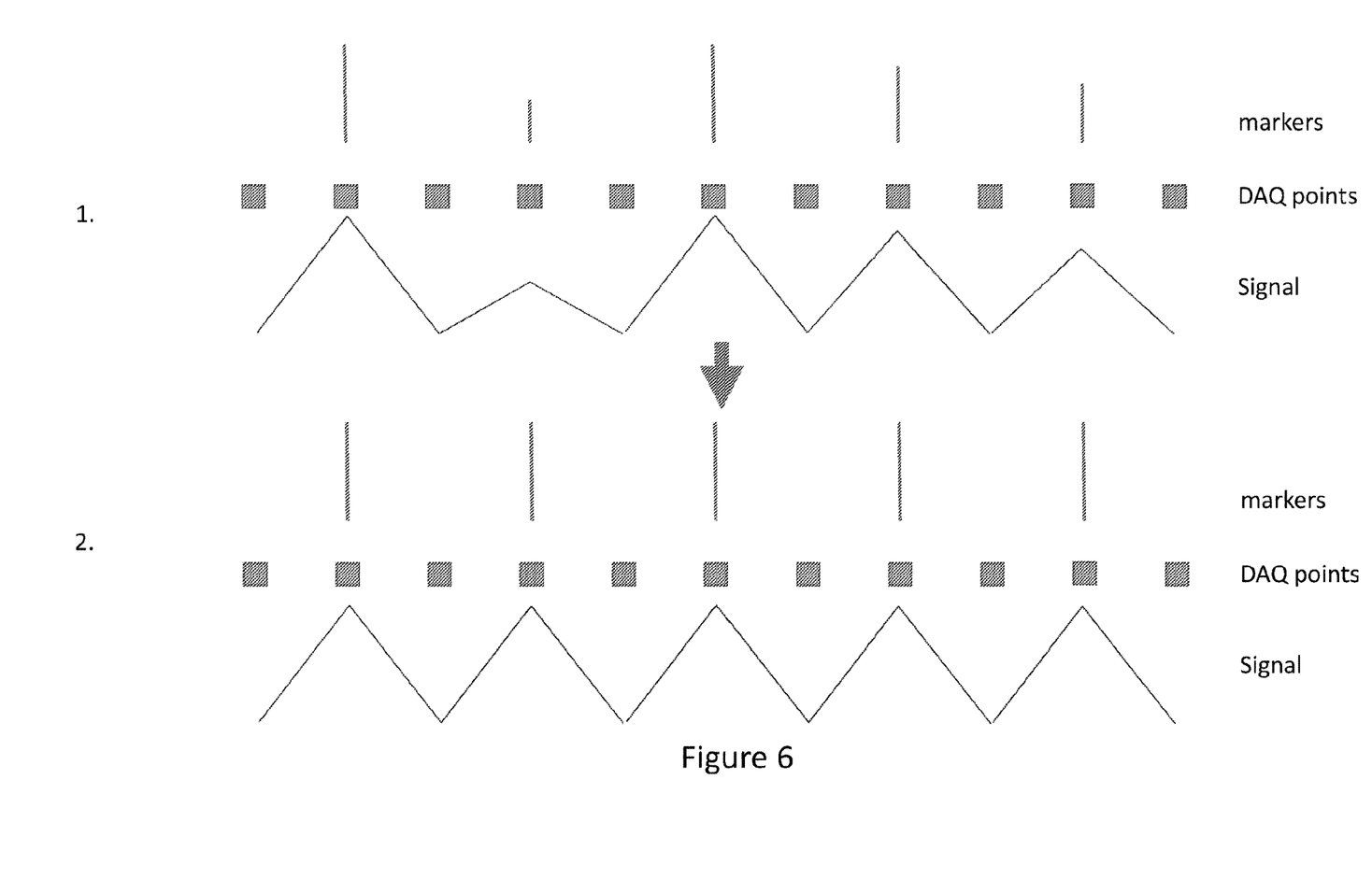
FIG. 6 is a diagram illustrating how reflective signal amplitude variations from different reflective markers can be normalised by making use of adaptive signal amplification or attenuation.
Figure 7:
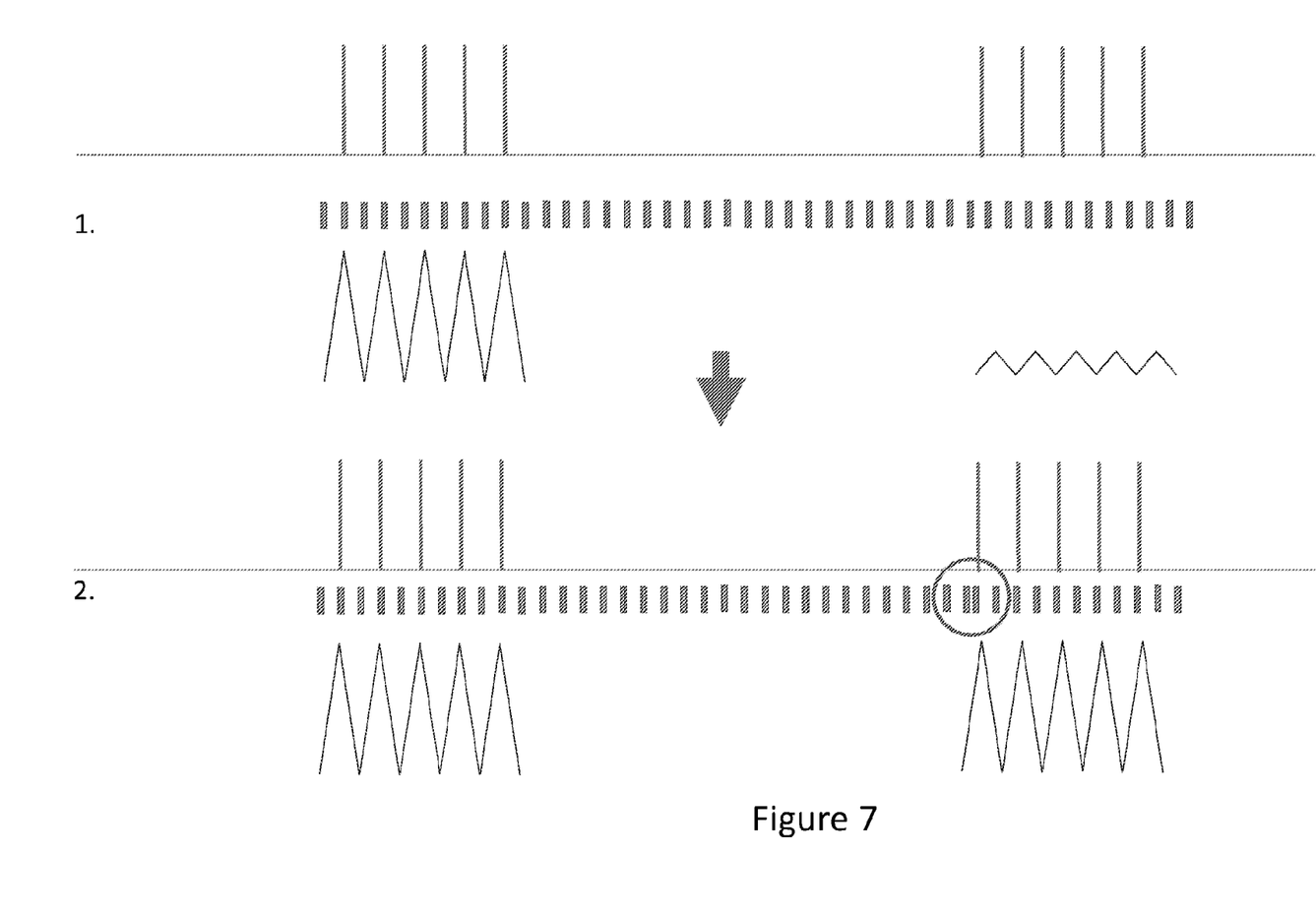
FIG. 7 is a diagram illustrating how DAQ sampling point synchronisation drift can be corrected by resetting the sampling points so as to be re-aligned with the reflections from the markers if the sampling points become too much out of synchronisation.

FIGS. 5, 6, and 7 illustrate the types of DAQ sampling point alignment and signal normalisation that can be achieved using the delays 3 and amplifiers/attenuators 5. In particular, FIG. 5 illustrates that sampling point alignment can be achieved by controlling the optical delay 3a and/or electrical delay 3b such that reflections from the markers align temporally with the DAQ sampling points. As described previously with respect to FIGS. 1 and 3, this ensures that good signal contrast is obtained from the reflections from the markers.

FIG. 6 illustrates the type of signal amplitude normalisation or equalisation that can be obtained from controlling the amplifiers/attenuators 5a and/or 5b. In particular, from examples 1 to 2 shown in the Figure is can be seen that the signal levels seen at the DAQ sampling module 7 can be equalised by rapidly changing the signal gain or attenuation, using components 5a or 5b. The amplification or attenuation applied can be controlled from sample to sample, to equalise the signal to be sampled into a desired dynamic range. As described previously, this allows lower resolution ADCs to be used in the DAQ stage 7, which are able to operate at higher speeds, and therefore provide improved spatial sensing resolution along the sensing fibre.

Finally, FIG. 7 illustrates a third type of sampling adjustment that can be made, in the form of sampling clock re-synching. As shown from examples 1 to 2 in the figure, clock re-synching by the DAQ sampling module 7 ensures good alignment with markers in the case that the marker spacing drifts from the target spacing over distance. FIG. 7 shows an example of a clock re-synching (circled) applied to align a second of two groups of markers. In this case, the clock re-synching occurs by monitoring the distribution of any variation in misalignment of the sampling points from the reflections, for example by measuring the signal level of the samples over distance as different delays are applied during a calibration stage, noting that any misalignment would be expected to vary slowly over time (for example hours to months timescale) so that only infrequent calibrations would be required. In such a case, the monitoring control loop in the DAQ then adjusts the phase of the sampling clock over distance so as to continuously realign with the markers.

In an alternative to the above, instead of re-synching the sampling clock with the marker reflections, the opposite could happen such that the reflections are re-aligned with the sampling clock, for example using the optical or electrical delays 3a or 3b to maintain alignment of the reflections with the sampling clock, if the control speed of the delays is sufficiently fast.

With the above, several control mechanisms are provided for use within the DAS to ensure that alignment of the DAQ sampling points with the reflections from the markers is maintained. As noted in the introduction, heretofore such alignment has not been necessary, as with DAS spatial resolutions measured in meters there has always been sufficient oversampling capacity within the DAQ module in the DAS for precise sampling point alignment not to matter. However as spatial resolution is improved to sub meter dimensions, the need to provide for control mechanisms to permit alignment of sampling point to marker reflections from along the fibre becomes more important, and the present embodiment provides such mechanisms to allow for temporal alignment of sampling points with marker reflections, as well as for reflection signal equalisation to allow faster sampling with lower dynamic range to be used.

Within the above we discuss that the spatial resolution is at the Nyquist limit of twice the highest sampling rate available from the DAQ electronics, and clearly such will give the finest (i.e. highest) spatial resolution possible. However, in other embodiments of the invention it is possible to run the system not quite at the highest possible speed and still provide a more sensitive higher resolution system than the prior art arrangements. In other embodiments, therefore, the predetermined relationship between the reflector spacing along the fiber and the sampling rate available from the DAQ electronics may be such that the spacing of the reflector portions along the fiber is in the range of at least twice but no more than four times the distance x light would travel in the fiber at the highest sampling rate of the DAQ electronics, and more preferably at least twice but no more than three times the distance x. Embodiments of the invention therefore provide some leeway in the predetermined relationship between sampling rate and reflector spacing, although the relationship is intentional and determinative between the two to allow for higher spatial resolution than has heretofore been possible to be obtained.

In terms of applications for such fine spatial resolution optical fibre sensing systems, as mentioned previously one such application is flow monitoring and metering of fluid flow along a pipe. The flow rate in a pipe can be determined from the changes in hoop strain exerted on the pipe walls by eddies which propagate with the flow. In the prior art, this hoop strain is measured at multiple points along the pipe length, for example by measuring the linear strain induced on an optical fibre wrapped on the pipe. Optical fibre is preferably often used as the sensor transducer as it can be deployed in hostile, space-constrained environments, such as down an oil well, where the deployment of electronics is often suboptimum.

Preferably, in embodiments of the invention the optical fibre is instead deployed in a simple, linear, configuration along the pipe, rather than wrapped on the pipe. The linear configuration is cheaper, easier to deploy, requires less fibre (so allowing longer ranges), is potentially more robust and, depending on the interrogation method used, allows fully distributed measurements.

The reason linear configurations have not been used previously, however, is that eddy tracking requires multiple, independent measurements along the distance over which a single eddy, or group of eddies propagate, before dissipating; this distance being commonly around four pipe diameters in length. With a typical oil well pipe (production tubing) diameter of circa 10 cm, the eddies propagate over a length of circa 40 cm. Achieving multiple independent measurements of strain within that 40 cm range with sufficient signal to noise ratio to track the eddy movement is currently beyond the abilities of existing distributed optical measurement systems. However, using the fine resolution sensing system of the present embodiments, which provide sensing resolutions of the order of 10.1 cm for a 2 GS/s data acquisition, then tracking such eddy movement over 40 cm of pipe then does become possible, thus leading to eddy tracking and flow monitoring along a pipe with linear configurations of sensing fibre laid along the pipe.

Various further modifications, whether by way of addition, deletion, or substitution may be made to above mentioned embodiments to provide further embodiments, any and all of which are intended to be encompassed by the appended claims.

The invention claimed is:

1. A distributed sensing system, comprising:
an optical fiber deployable in an environment to be sensed, the optical fiber having reflector portions regularly distributed in at least a first region thereof and having a first fixed and known spacing therebetween;
an optical signal source arranged in use to input optical pulses into the optical fiber; and
sensing apparatus arranged in use to detect light from the optical pulses reflected back along the optical fiber from the reflector portions and to determine any one or more of an acoustic, vibration, strain, temperature or other parameter that perturbs the path length of the optical fiber in dependence on the reflected light, the sensing apparatus comprising opto-electronic componentry that samples the reflected light or light derived therefrom at temporally discrete sampling points at a first sampling rate;

wherein
the first sampling rate is of a value that is at or near to the Nyquist limit for the fixed and known spacing between the reflector portions in the at least first region of the optical fiber such that no oversampling occurs, and
the sensing apparatus further comprises pulse reflection alignment componentry arranged to temporally align reflected light from the optical pulses reflected back along the fiber from the reflector portions with the sampling points, the pulse reflection alignment componentry comprising one or more variable delay components arranged to apply a delay to pulse reflections from the reflector portions as received at the sensing apparatus to temporally align the pulse reflections with the sampling points.

2. A distributed sensing system according to claim 1, wherein the first sampling rate is at least twice the spacing of the reflector portions, given the speed of light in the fiber.

3. A distributed sensing system according to claim 1, wherein the one or more variable delay components comprises one or more optical delays arranged to delay the pulse reflections before they are sampled by the opto-electronic componentry.

4. A distributed sensing system according to claim 1, wherein the one or more variable delay components comprises one or more electrical delays arranged to delay the electrical signals between conversion from reflected light pulses to electrical signals and the sampling of the converted signals.

5. A distributed sensing system according to claim 1, wherein the opto-electronic componentry further comprises sample point reset circuitry to reset the timing of the sampling points should they misalign with the reflected light from the optical pulses received at the sensing apparatus from the reflector portions along the fiber.

6. A distributed sensing system according to claim 1, and further comprising signal level adjustment circuitry arranged to equalise the amplitude of the reflected light from the reflector portions received at the sensing apparatus.

7. A distributed sensing system according to claim 6, wherein the signal level adjustment circuitry equalises the amplitude of the reflected light in order to reduce the required dynamic range of the opto-electronic componentry that samples the reflected light.

8. A distributed sensing system according to claim 6, wherein the signal level adjustment circuitry comprises one or more of a signal amplifier or attenuator, the signal amplifier or attenuator being one of either;
i) an electrical amplifier or attenuator; or
ii) an optical amplifier or attenuator.

9. A method of monitoring flow along a pipe, comprising:
providing a distributed sensing apparatus according to claim 1, the optical fiber of the sensing apparatus being deployed substantially linearly along the length of the pipe;
operating the distributed sensing apparatus to obtain acousto-vibrational data pertaining to flow conditions within the pipe;
processing the acousto-vibrational data to identify eddies within the flow within the pipe; and
tracking the identified eddies within the flow along the pipe in dependence on the acousto-vibrational data.

10. A method according to claim 9, and further comprising, determining the flow speed of fluid flow along the pipe in dependence on the tracking of the identified eddies in the fluid flow as the eddies move along the pipe.

11. A distributed sensing system, comprising:
an optical fiber deployable in an environment to be sensed, the optical fiber having reflector portions regularly distributed in at least a first region thereof and having a first spacing therebetween;
an optical signal source arranged in use to input optical pulses into the optical fiber; and
sensing apparatus arranged in use to detect light from the optical pulses reflected back along the optical fiber from the reflector portions and to determine any one or more of an acoustic, vibration, strain, temperature or other parameter that perturbs the path length of the optical fiber in dependence on the reflected light, the sensing apparatus comprising opto-electronic componentry that samples the reflected light or light derived therefrom at temporally discrete sampling points at a first known sampling rate that gives a first known sampling period;
wherein the first spacing between each of the reflector portions in the at least first region of the optical fiber is of a size that is at least twice the distance travelled by the optical pulses along the fiber in one of the first known sampling periods, such that the first sampling rate is at or near to the Nyquist limit and no oversampling occurs; and
the sensing apparatus further comprises pulse reflection alignment componentry arranged to temporally align reflected light from the optical pulses reflected back along the fiber from the reflector portions with the sampling points, the pulse reflection alignment componentry comprising one or more variable delay components arranged to apply a delay to pulse reflections from the reflector portions as received at the sensing apparatus to temporally align the pulse reflections with the sampling points.

12. A distributed sensing system according to claim 11, wherein the spacing of the reflector portions along the fiber is equal to twice the distance x light would travel in the fiber at the highest sampling rate of the opto-electronic componentry.

13. A distributed sensing system according to claim 11, wherein the one or more variable delay components comprises one or more optical delays arranged to delay the pulse reflections before they are sampled by the opto-electronic componentry.

14. A distributed sensing system according to claim 11, wherein the one or more variable delay components comprises one or more electrical delays arranged to delay the electrical signals between conversion from reflected light pulses to electrical signals and the sampling of the converted signals.

15. A distributed sensing system according to claim 11, wherein the opto-electronic componentry further comprises sample point reset circuitry to reset the timing of the sampling points should they misalign with the reflected light from the optical pulses received at the sensing apparatus from the reflector portions along the fiber.

16. A method of monitoring flow along a pipe, comprising:
providing a distributed sensing apparatus according to claim 11, the optical fiber of the sensing apparatus being deployed substantially linearly along the length of the pipe;
operating the distributed sensing apparatus to obtain acousto-vibrational data pertaining to flow conditions within the pipe;
processing the acousto-vibrational data to identify eddies within the flow within the pipe; and
tracking the identified eddies within the flow along the pipe in dependence on the acousto-vibrational data.

17. A method according to claim 16, and further comprising, determining the flow speed of fluid flow along the pipe in dependence on the tracking of the identified eddies in the fluid flow as the eddies move along the pipe.

* * * * *